(12) United States Patent
Wada et al.

(10) Patent No.: US 9,025,903 B2
(45) Date of Patent: May 5, 2015

(54) IMAGE PROCESSING DEVICE AND IMAGE PROCESSING METHOD

(75) Inventors: Yasuaki Wada, Kanagawa-ken (JP); Yasunori Taguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 443 days.

(21) Appl. No.: 13/221,950

(22) Filed: Aug. 31, 2011

(65) Prior Publication Data
US 2012/0070099 A1    Mar. 22, 2012

(30) Foreign Application Priority Data

Sep. 21, 2010 (JP) ................................. 2010-211410

(51) Int. Cl.
G06K 9/40 (2006.01)
G06T 5/00 (2006.01)
G06T 5/20 (2006.01)

(52) U.S. Cl.
CPC . G06T 5/002 (2013.01); G06T 5/20 (2013.01); G06T 2207/20012 (2013.01); G06T 2207/20192 (2013.01)

(58) Field of Classification Search
CPC .. G06K 9/00503; G06T 7/0079; G06T 5/002; G06T 2207/20021; G06T 2207/20024; G06T 2207/20192; G06T 7/403
See application file for complete search history.

(56) References Cited

U.S. PATENT DOCUMENTS 5,271,064 A * 12/1993 Dhawan et al. ............... 382/266
6,064,776 A *  5/2000 Kikuchi et al. ............... 382/260
6,192,162 B1 *  2/2001 Hamilton et al. ............. 382/266
6,259,823 B1 *  7/2001 Lee et al. ...................... 382/268
6,295,382 B1 *  9/2001 Karanovic .................... 382/261
6,954,287 B1 * 10/2005 Balasubramanian et al. . 358/1.9
7,292,733 B2    11/2007 Monobe et al.
7,418,132 B2 *  8/2008 Hoshuyama .................. 382/167

(Continued)

FOREIGN PATENT DOCUMENTS

EP      2190183 A1    5/2010
JP   H09-051532 A    2/1997

(Continued)

OTHER PUBLICATIONS

Bosco, Angelo, Sebastiano Battiato, Arcangelo Bruna, and Rosetta Rizzo. "Texture sensitive denoising for single sensor color imaging devices." In Computational Color Imaging, pp. 130-139. Springer Berlin Heidelberg, 2009.*

(Continued)

Primary Examiner — Michelle Entezari
(74) Attorney, Agent, or Firm — Posz Law Group, PLC

(57) ABSTRACT

An image processing device includes: a first edge strength calculation part that calculates a first edge strength for a focus pixel based on pixel values in a first region that includes the focus pixel in an input image; a second edge strength calculation part that calculates a second edge strength for the focus pixel based on pixel values in a second region that is smaller than the first region and that includes the focus pixel; and a filter processing part that determines a filter coefficient such that a first smoothing strength is higher than a second smoothing strength and that filters the input image using the filter coefficient. The first smoothing strength is obtained where the first edge strength is higher than a first reference value and where the second edge strength is lower than a second reference value, and the second smoothing strength is obtained in other cases.

12 Claims, 11 Drawing Sheets

(56) References Cited

U.S. PATENT DOCUMENTS

| | | | |
|---|---|---|---|
| 7,428,343 B2* | 9/2008 | Jung | 382/254 |
| 7,616,829 B1* | 11/2009 | Bilbrey et al. | 382/268 |
| 7,660,484 B2* | 2/2010 | Ahn et al. | 382/275 |
| 8,218,891 B2* | 7/2012 | Seki et al. | 382/260 |
| 8,320,697 B2* | 11/2012 | Watarai | 382/261 |
| 8,374,460 B2 | 2/2013 | Hara et al. | |
| 8,532,425 B2* | 9/2013 | Ali et al. | 382/260 |
| 8,537,903 B2* | 9/2013 | Lim | 375/240.29 |
| 8,644,636 B2* | 2/2014 | Shin et al. | 382/264 |
| 8,750,638 B2* | 6/2014 | Hara | 382/255 |
| 8,879,000 B2* | 11/2014 | Shin et al. | 348/607 |
| 2005/0094889 A1* | 5/2005 | Lin et al. | 382/261 |
| 2007/0103570 A1* | 5/2007 | Inada et al. | 348/252 |
| 2007/0237241 A1* | 10/2007 | Ha et al. | 375/240.27 |
| 2008/0131019 A1* | 6/2008 | Ng | 382/255 |
| 2008/0267530 A1* | 10/2008 | Lim | 382/284 |
| 2009/0251561 A1* | 10/2009 | Kuang et al. | 348/223.1 |
| 2009/0252434 A1* | 10/2009 | Zhou | 382/276 |
| 2010/0238294 A1* | 9/2010 | Hogasten et al. | 348/164 |
| 2010/0245672 A1* | 9/2010 | Erdler et al. | 348/608 |
| 2011/0069883 A1* | 3/2011 | Fujisawa | 382/170 |

FOREIGN PATENT DOCUMENTS

| | | |
|---|---|---|
| JP | 2005-295488 A | 10/2005 |
| JP | 2009-071419 A | 4/2009 |
| JP | 2009-266233 A | 11/2009 |
| JP | 2010-057157 A | 3/2010 |
| JP | 2012019319 A * | 1/2012 |

OTHER PUBLICATIONS

Background Art Information Sheet provided by applicants (Jan. 24, 2011) (1 page total).

Office action dated Aug. 7, 2012 in the corresponding JP application No. 2010-211410 (English translation only).

Office action dated Mar. 19, 2013 in the corresponding JP application No. 2010-211410 (English translation only).

* cited by examiner

IMAGE PROCESSING DEVICE AND IMAGE PROCESSING METHOD

CROSS-REFERENCE TO RELATED APPLICATION

This application is based upon and claims the benefit of priority from the prior Japanese Patent Application No. 2010-211410, filed Sep. 21, 2010, the entire contents of which are incorporated herein by reference.

BACKGROUND

1. Technical Field

Embodiments described herein generally relate to an image processing device, method and program.

2. Description of the Related Art

The quality of digital images degrades as a result of irreversible image compression. The degradation of the images is visibly recognizable. Variations in luminance values appear around the edges of compressed image are called mosquito noise.

In a conventional image processing device for reducing mosquito noise, the strength of a smoothing filter is increased at the edge region and is decreased in other regions. As a result, the mosquito noise is reduced because the luminance values are significantly smoothed at the edge periphery (the periphery of compressed image edge) where the mosquito noise occurs. However, because such strong smoothing is applied to the edge parts, the edges are blurred.

Figure 1:
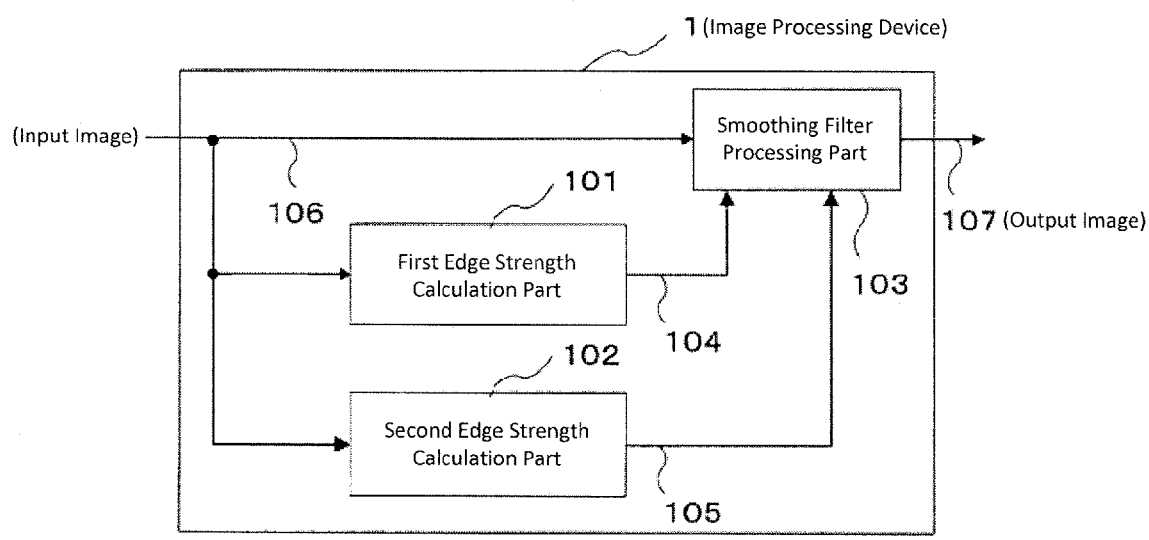
FIG. 1 is a block diagram illustrating a configuration of an image processing device according to the first embodiment.

DETAILED DESCRIPTION OF EMBODIMENT (First Embodiment) In FIG. 1, an image processing device 1 generates an output image 107 by performing a filtering process for each pixel in an input image 106. The image processing device 1 includes a first edge strength calculation part 101, a second edge strength calculation part 102 and a smoothing filter processing part 103. The first edge strength calculation part 101 calculates a first edge strength 104 in a first region including a focus pixel and a periphery thereof. The second edge strength calculation part 102 calculates a second edge strength 105 in a second region including the focus pixel. The smoothing filter processing part 103 generates the output image 107 by performing the smoothing in response to the first edge strength and the second edge strength.

Figure 10:
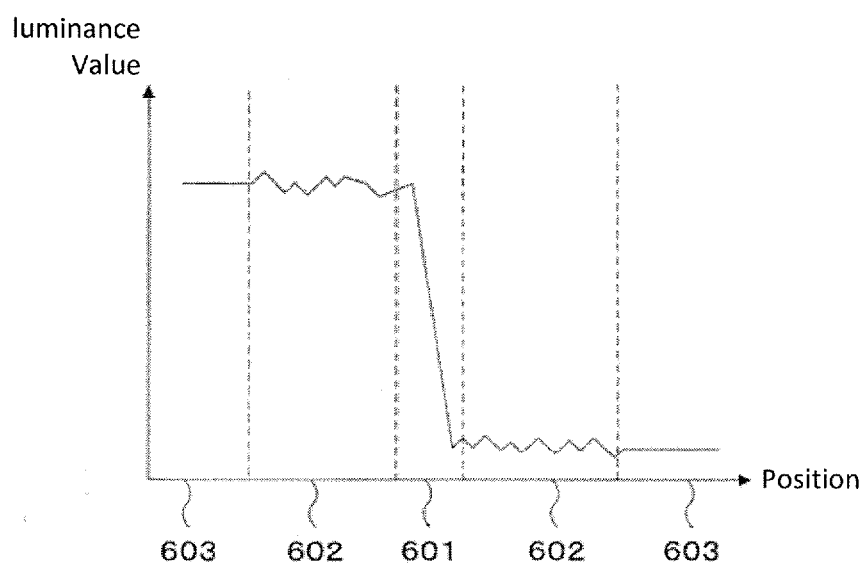
FIG. 10 is a luminance cross-sectional view of an edge part and an edge peripheral part at which mosquito noise occurs.

FIG. 10 is a luminance cross-sectional view of the edge periphery region in a decoded image of the compressed image data. The horizontal axis indicates a coordinate of the image, and the vertical axis indicates the luminance value. The mosquito noise occurs at the edge periphery 602. The image processing device of the present embodiment controls the strength of the smoothing filter. The strength of the smoothing filter at the edge 601 is controlled to become low and the strength of the smoothing filter at the edge periphery 602 is controlled to become high.

Figure 2:
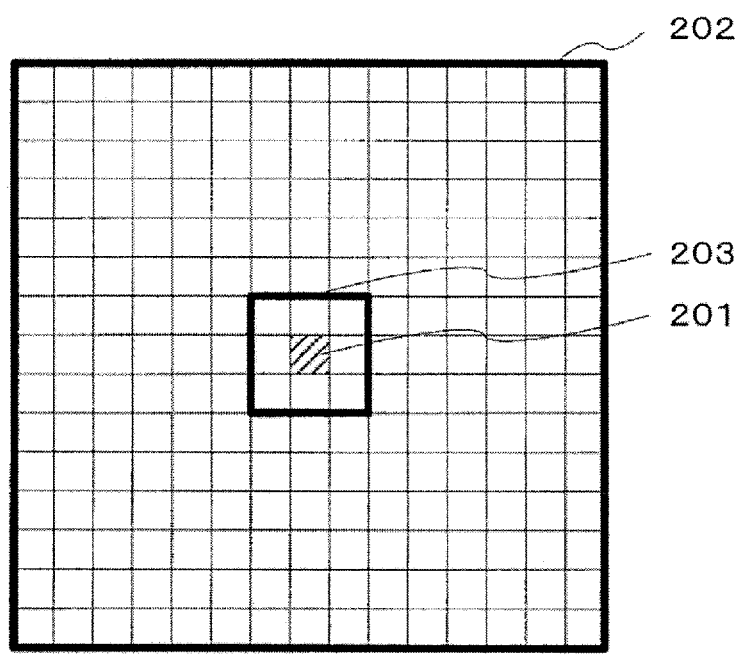
FIG. 2 illustrates a definition of image regions in the first embodiment.

Using FIG. 2, the focus pixel and the first and second regions are explained. A focus pixel 201 is one of the pixels forming an image. A first region 202 is a region including the focus pixel 201. The first region 202 is used to detect an edge that causes mosquito noise to occur at the position of the focus pixel 201. A second region 203 is a region for calculating the edge strength of the focus pixel and is smaller than the first region 202. In FIG. 2, the first region 202 is a rectangular region formed by 15×15 pixels. The second region 203 is a rectangular region formed by 3×3 pixels. However, the first region 202 and the second region 203 are not limited to these sizes and shapes. For example, the shapes of the first region and the second region may be polygonal, circular or oval.

Figure 3:
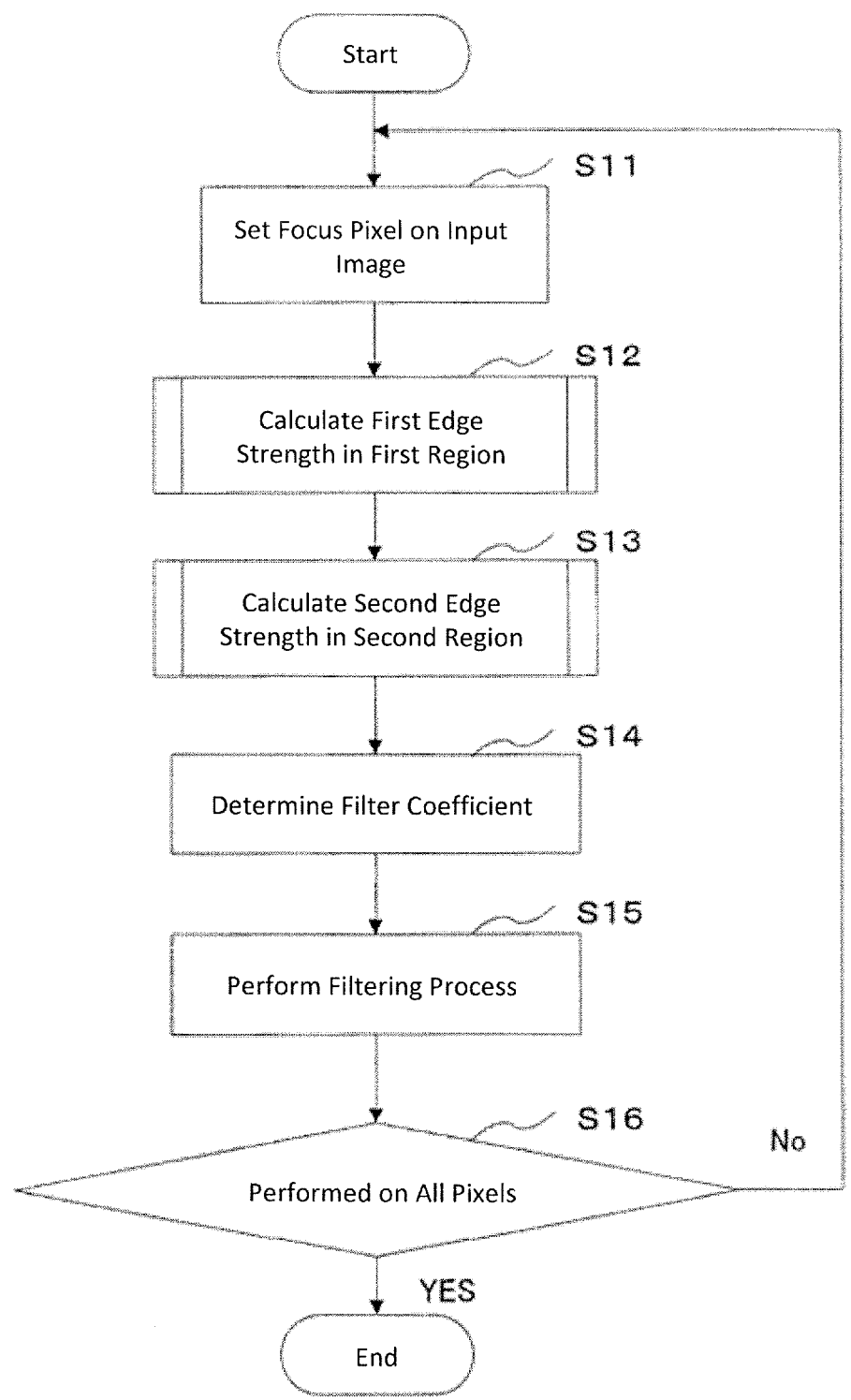
FIG. 3 is a flow diagram illustrating an operation of the first embodiment.

Referring to FIG. 3, an operation of the image processing device 1 is explained.

A case is explained below using the focus pixel 201, the first region 202 and the second region 203 shown in FIG. 2, in which a decoded image is separated into luminance (Y) and chrominance (UV) component signals (YUV signals) and in which a noise reduction process is performed on the Y component (luminance).

First, the focus pixel 201 is set on the input image 106 (S11).

The first edge strength calculation part 101 calculates the first edge strength 104 from pixels of the input image 106 that are included in the first region 202 (S12). The first edge strength 104 is sent to the smoothing filter processing part 103. The first edge strength 104 of the present embodiment is the maximum value of first-order derivative values that are respectively calculated for the pixels in the first region 202. For the first edge strength 104, the maximum value of second-order derivative values that are calculated for the pixels in the first region 202, for example, may be used. Alternatively, a difference between the maximum value and the minimum value of the luminance values obtained at each pixel in the first region 202 may instead be used. Yet alternatively, a maximum value of luminance gradients of the luminance values respectively obtained at pixels in the first region 202 may be used.

The second edge strength calculation part 102 calculates the second edge strength 105 from pixels of the input image 106 that are included in the second region 203 (S13). The second edge strength 105 is sent to the smoothing processing part 103. The second edge strength 105 of the present embodiment is the maximum value of first-order derivative values that are respectively calculated for the pixels in the second region 203. For the second edge strength 105, the maximum value of second-order derivative values that are respectively calculated for the pixels in the second region 203, for example, may instead be used. Alternatively, a first or second-order derivative value for the focus pixel may be used. Yet alternatively, a difference value between the maximum value and the minimum value of the luminance respectively obtained at pixels in the second region 203 may be used. In addition, a value of a luminance gradient of the focus pixel may be used.

The smoothing filter processing part 103 performs the smoothing filtering on the focus pixel 201 in the input image 106 based on the first edge strength 104 and the second edge strength 105. The smoothing filter processing part 103 determines whether or not a value of the first edge strength 104 is higher than a first reference value and whether or not a value of the second edge strength 105 is lower than a second reference value. The smoothing filter processing part 103 determines a filter coefficient such that a smoothing strength (or first smoothing strength), which, in the case where the first edge strength 104 is higher than the first reference value and where the second edge strength 105 is lower than the second reference value, becomes higher than another smoothing strength (or second smoothing strength) in other cases (S14). The other cases are where the first edge strength 104 is higher than the first reference value and where the second edge strength 105 is higher or lower than the second reference value, or the the first edge strength 104 is lower than the first reference value and where the second edge strength 105 is lower than the second reference value. Alternatively, the filter coefficient may be set using a function or table such that the smoothing strength becomes higher as the first edge strength 104 increases and that the smoothing strength becomes higher as the second edge strength 105 decreases.

Using a filter (or the determined filter coefficient of this embodiment), the smoothing filter processing part 103 performs a filtering process on the input image 106 and calculates the pixel Y component (luminance) of the output image 107 (S15). The process ends when the process from S11 through S15 is performed on all of the pixels 201 (S16). When there is a remaining pixel, which has not been processed, in the input image 106, the processing returns to S11. Another pixel in the input image 106 is selected as a new focus pixel 106, and the process from S11 through S15 is repeated on the new focus pixel.

As described above, with the image processing device 1 of the first embodiment, the strength of the smoothing filter processing is controlled such that the strength of the smoothing filter processing increases at the edge periphery 602, and the strength of the smoothing filter processing decreases at the edge 601 (see FIG. 10). Therefore, the blurring of the edge that occurs when mosquito noise is reduced is suppressed.

Figure 4:
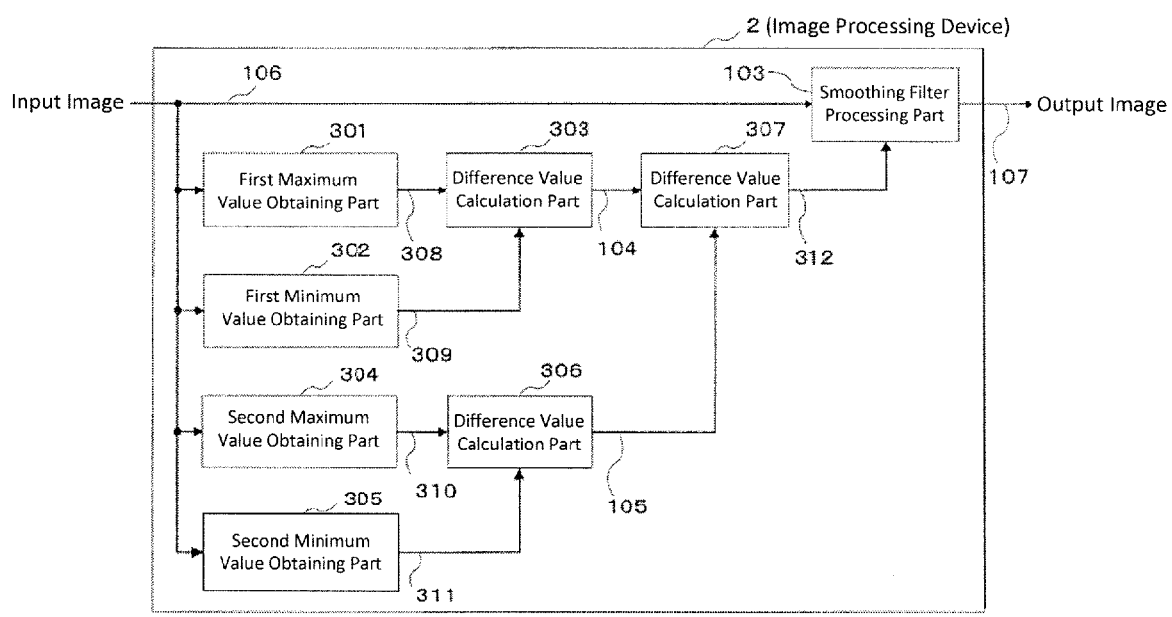
FIG. 4 is a block diagram illustrating a configuration of an image processing device 2 according to the second embodiment.

(Second Embodiment) FIG. 4 is a block diagram of an image processing device 2 of the second embodiment. The image processing device 2 calculates a first edge strength and a second edge strength. The image processing device 2 sets a filter coefficient based on the calculated first edge strength and second edge strength and performs smoothing using an ϵ filter. The image processing device 2 includes the following parts: a first maximum value obtaining part 301 that determines a maximum value 308 of luminance values in the first region; a first minimum value obtaining part 302 that determines a minimum value 309 of the luminance values in the first region; a difference value calculation part 303 that determines a difference 104 between the maximum value 308 and the minimum value 309; a second maximum value obtaining part 304 that determines a maximum value 310 of luminance values in the second region; a second minimum value obtaining part 305 that determines a minimum value 311 of the luminance values in the second region; a difference value calculation part 306 that determines a difference 105 between the maximum value 310 and the minimum value 311; a difference value calculation part 307 that determines a difference 312 between the difference 104 and the difference 105; and a smoothing filter processing part 103 that performs smoothing filter processing on the input image 106 based on the difference 312.

Figure 5:
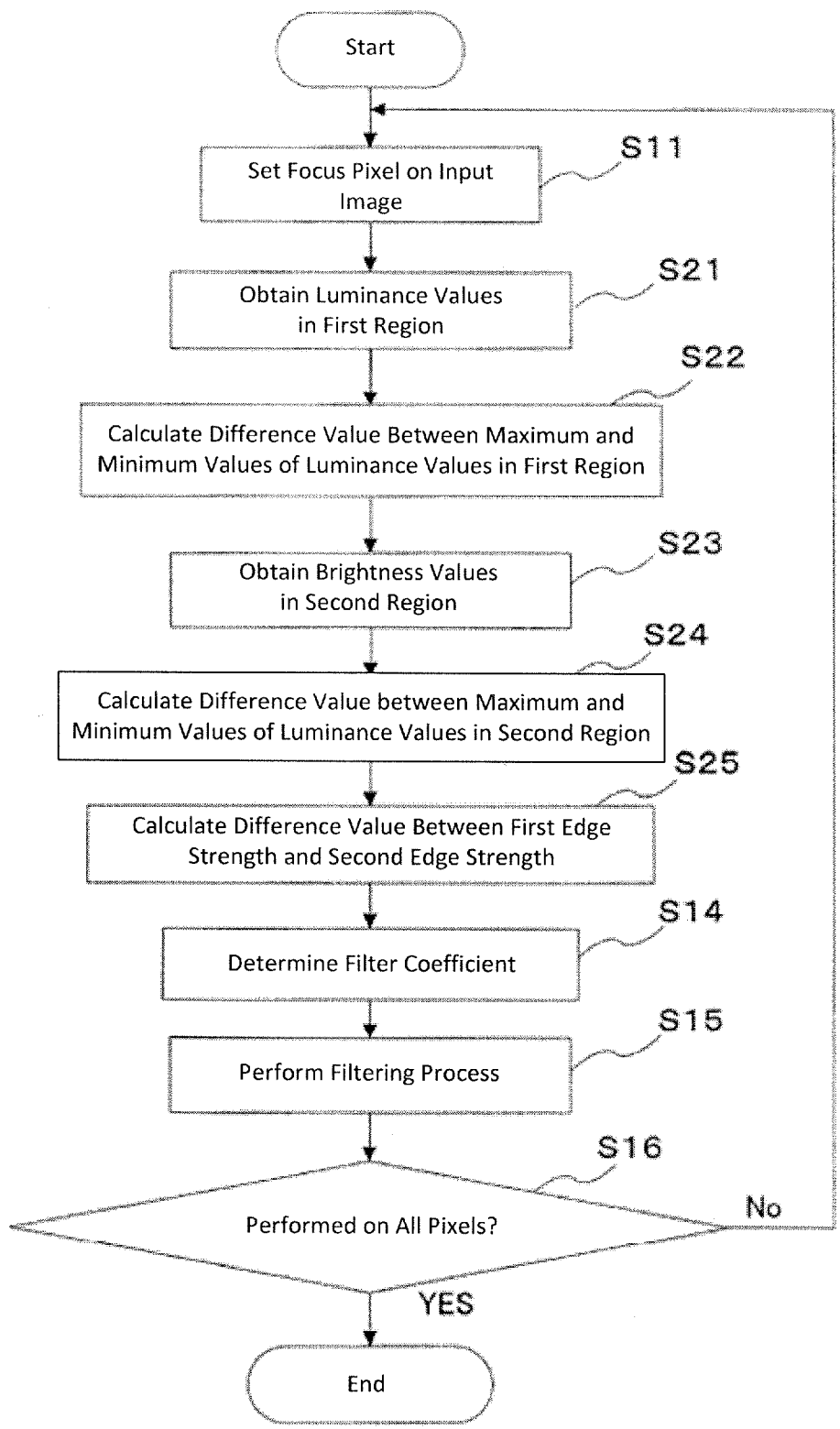
FIG. 5 is a flow diagram illustrating an operation of the image processing device 2 according to the second embodiment.

Referring to FIG. 5, an operation of the image processing device 2 is explained. In FIG. 5, the processes that correspond to those in the operation of the image processing device 1 are indicated by the same reference numerals as those in FIG. 3. Descriptions for such processes are omitted in the below explanation. FIG. 11 is a conceptual diagram illustrating the first edge strength, the second edge strength and the difference 312.

The first maximum value obtaining part 301 obtains the maximum value 308 of luminance values of pixels in the first region 202 on the input image 106. The first minimum value obtaining part 302 obtains the minimum value 309 of the luminance values of the pixels in the first region 202 (S21).

Figure 11A:
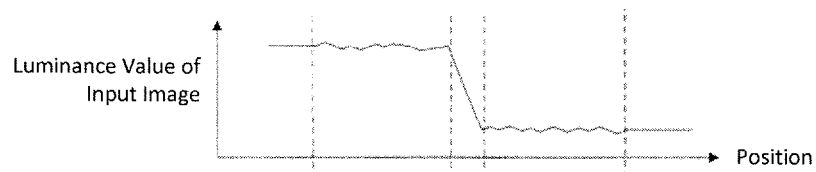
FIG. 11 illustrates a calculation process of a signal by the image processing device 2 according to the second embodiment.
Figure 11B:
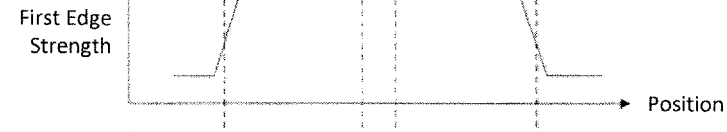

The difference value calculation part 303 calculates the first edge strength 104, which is a difference value between the maximum value 308 determined by the first maximum value obtaining part 301 and the minimum value 309 determined by the first minimum value obtaining part 302 (S22). With respect to the input luminance values shown in FIG. 11A, values of the first edge strength 104 increase at the edge part 601 and at the edge periphery 602 as shown in FIG. 11B.

The second maximum value 304 obtains the maximum value 310 of the luminance values of the pixels in the second region 203 on the input image 106. The second minimum value obtaining part 305 obtains the minimum value 311 of the luminance values of the pixels in the second region 203 (S23).

Figure 11C:
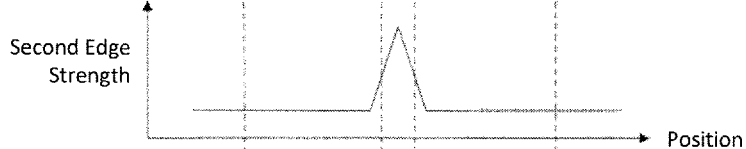

The difference value calculation part 306 calculates the second edge strength 105, which is a difference value between the maximum value 310 determined by the second maximum value obtaining part 304 and the minimum value 311 determined by the second minimum value obtaining part 305 (S24). With respect to the input luminance value shown in FIG. 11A, values of the second edge strength 105 increase at the edge part 601 as shown in FIG. 11C.

Figure 11D:
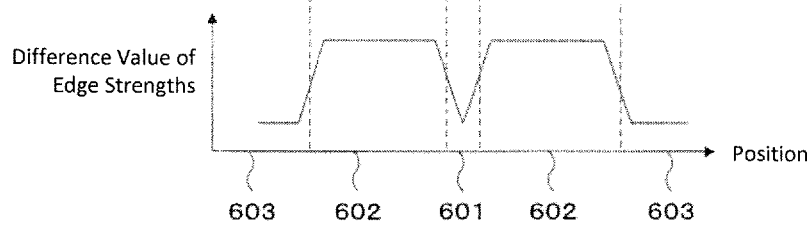

The difference value calculation part 307 determines the edge strength difference value 312, which is a difference value between the first edge strength 104 and the second edge strength 105 (S25). In the below explanation, DMG(x, y) means the edge strength difference value 312 for the focus pixel 201 at position (x, y) on the input image 106. Values of the edge strength difference value 312 increase at the edge peripheries 602 as shown in FIG. 11D.

The smoothing filter processing part 103 determines a filter coefficient based on the edge strength difference value 312 (S14). The edge strength difference value 312 (DMG(x, y)) has a characteristic to increase when a strong edge exists on the periphery of the focus pixel 201 (x, y) but to decrease when the focus pixel 201 (x, y) is on the edge. The ϵ filter, for example, is used as the filter and is explained later. A parameter ϵ(x, y) of the filter is determined by the following equation:

$$\epsilon(x,y) = K \times DMG(x,y) \qquad \text{(Equation 1).}$$

In Equation 1, K represents a preset constant value. In the present embodiment, the smoothing filter processing part 103 defines ϵ(x, y) in a linear function in response to the edge strength difference value DMG(x, y). However, the function is not limited to be linear. For example, the process for determining the filter may be realized by the smoothing filter processing part 103 using a look up table (LUT) or a function by which ϵ(x, y) is outputted such that ϵ(x, y) becomes larger as the edge strength difference value DMG(x, y) increases when the edge strength difference value DMG(x, y) is inputted.

The smoothing filter processing part 103 performs the above-described filtering process (S15). When the ϵ filter is used as the smoothing filter, the filter calculation is represented by the following equation:

$$g(x, y) = f(x, y) - \sum_{i,j} a_{i,j} h_\varepsilon(x, y, i, j)$$

$$h_\varepsilon(x, y, i, j) = \begin{cases} f(x, y) - f(x+i, y+j) & |f(x, y) - f(x+i, y+j)| \le \varepsilon(x, y) \\ 0 & \text{otherwise.} \end{cases}$$

In Equation 2, f(x, y) represents a luminance value at the pixel (x, y) of the input image, (i, j) represents a relative position of each peripheral pixel to the focus pixel (x, y), a coefficient $a_{ij}$ represents a low-pass filter coefficient of which the summation becomes 1, and g(x, y) represents a luminance value at the pixel (x, y) of the output image. And h(x,y,i,j) represents a function for calculating a weighted average using the luminance value of pixel(x,y) within ±ϵ(x,y)

According to Equation 1, an absolute value of ϵ(x, y) becomes larger as the edge strength difference value DMG(x, y) increases. According to Equation 2, stronger smoothing is performed as the absolute value of ϵ(x, y) increases. As discussed above, the value of DMG(x, y) becomes large at the edge periphery and becomes small on the edge. That is, the smoothing strength becomes high only at the edge periphery.

A case in which the ϵ filter is used is explained in the present embodiment. Alternatively, a Gaussian filter or a bilateral filter may be used. Filter calculation using a Gaussian filter is represented by the following equation:

$$g(x, y) = a_g \sum_{i,j} f(x+i, y+j) h_g(i, j) \quad \text{Equation 3}$$

$$h_g(i, j) = \frac{1}{2\pi\sigma(x, y)^2} \exp\left(-\frac{i^2 + j^2}{2\sigma(x, y)^2}\right)$$

$$\sigma(x, y) = K_g \times DMG(x, y)$$

$$a_g = \frac{1}{\sum_{i,j} h_g(i, j)}.$$

In Equation 3, $K_g$ is a preset constant value, and $h_g(i,j)$ represents a function for calculating a coefficient of Gaussian filter and is controlled by σ(x, y). The coefficient $a_g$ represents a low-pass filter, in this case the sum of $h_g(i,j)$ is 1. The value of σ(x, y) becomes larger as the value of DMG(x, y) increases. Stronger smoothing is performed as the absolute value of σ(x, y) increases. Therefore, stronger smoothing is performed as the DMG(x, y) increases. As discussed above, the value of DMG(x, y) increases at the edge periphery and decreases on the edge. Therefore, the smoothing strength becomes high only at the edge periphery.

The filter calculation using a bilateral filter is represented by the following equation:

$$g(x, y) = \sum_{i,j} a_{BF} f(x+i, y+j) h_{BF}(x, y, i, j) \quad \text{Equation 4}$$

$$h_{BF}(x, y, i, j) =$$

$$\exp\left\{-\frac{i^2 + j^2}{2\sigma_d^2}\right\} \exp\left\{-\frac{(f(x, y) - f(x+i, y+j))^2}{2\sigma_r(x, y)^2}\right\}$$

$$a_{BF} = \frac{1}{\sum_{i,j} h_{BF}(x, y, i, j)}$$

(Equation 2)

-continued
$$\sigma_r(x, y) = K_{BFr} \times DMG(x, y)$$
$$\sigma_d(x, y) = K_{BFd} \times DMG(x, y).$$

In Equation 4, $K_{BFd}$ and $K_{BFr}$ are preset constant values, $\sigma_d$ is a standard deviation in a domain direction, and $\sigma_r$ is a standard deviation in a range direction. $h_g(i,j)$ represents a function for calculating a coefficient of bilateral filter and is controlled by the value of $\sigma_d$ and the value of $\sigma_r$. The coefficient $a_g$ represents a low-pass filter in which the sum of $h_g(i,j)$ is 1.

Because the value of $\sigma_r(x, y)$ becomes higher as the value of DMG(x, y) increases, stronger smoothing is performed as the DMG(x, y) increases. Therefore, the smoothing strength becomes high only at the edge periphery.

As described above, the image processing device 2 of the second embodiment controls the strength of the smoothing filter process such that the strength increases at the edge periphery and decreases at the edge. As a result, the blurring of the edge is suppressed when mosquito noise is reduced.

Figure 6:
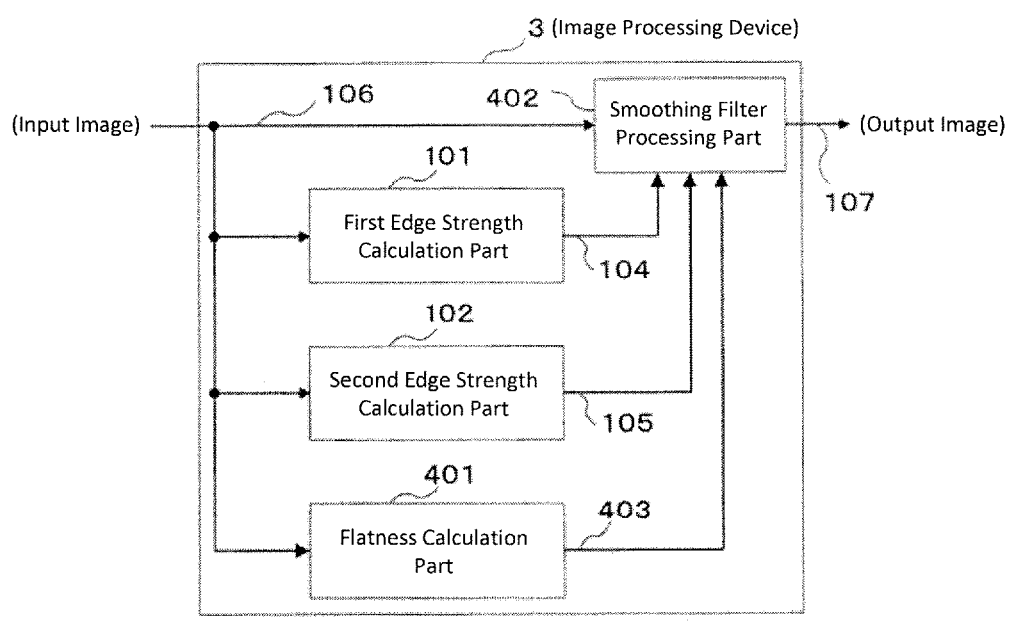
FIG. 6 is a block diagram illustrating a configuration of an image processing device 3 according to the third embodiment.

(Third Embodiment) Referring to FIG. 6, a block diagram of an image processing device 3 of the third embodiment is explained. The image processing device 3 includes the first edge strength calculation part 101, the second edge strength calculation part 102, a flatness calculation part 401 that calculates flatness in a third region 501 that includes the focus pixel and the periphery thereof, and a smoothing filter processing part 402.

The image processing device 3 suppresses over-smoothing of a region in which noise is superimposed on a texture in the edge periphery. The image processing device 3 further includes the flatness calculation part 401 that determines whether or not the focus pixel is in a flat region.

The image processing device 3 controls the smoothing strength such that the smoothing strength becomes higher as the flatness 403 calculated by the flatness calculation part 401 decreases. The image processing device 3 also controls the smoothing strength such that the smoothing strength becomes higher as the first edge strength increases. The image processing device 3 further controls the smoothing strength such that the smoothing strength becomes higher as the second edge strength decreases. Thereby, it becomes more difficult to recognize the blurring of the texture at the edge periphery. Note that the image processing device 3 might be configured to set the smoothing strength (or first smoothing strength) in a specific case higher than that in any other cases from the specific case. The smoothing strength in the specific case is defined where the flatness is higher than the first standard value, the first edge strength discussed above is higher than the first standard value, and the second edge strength is lower than the second standard value.

Figure 7:
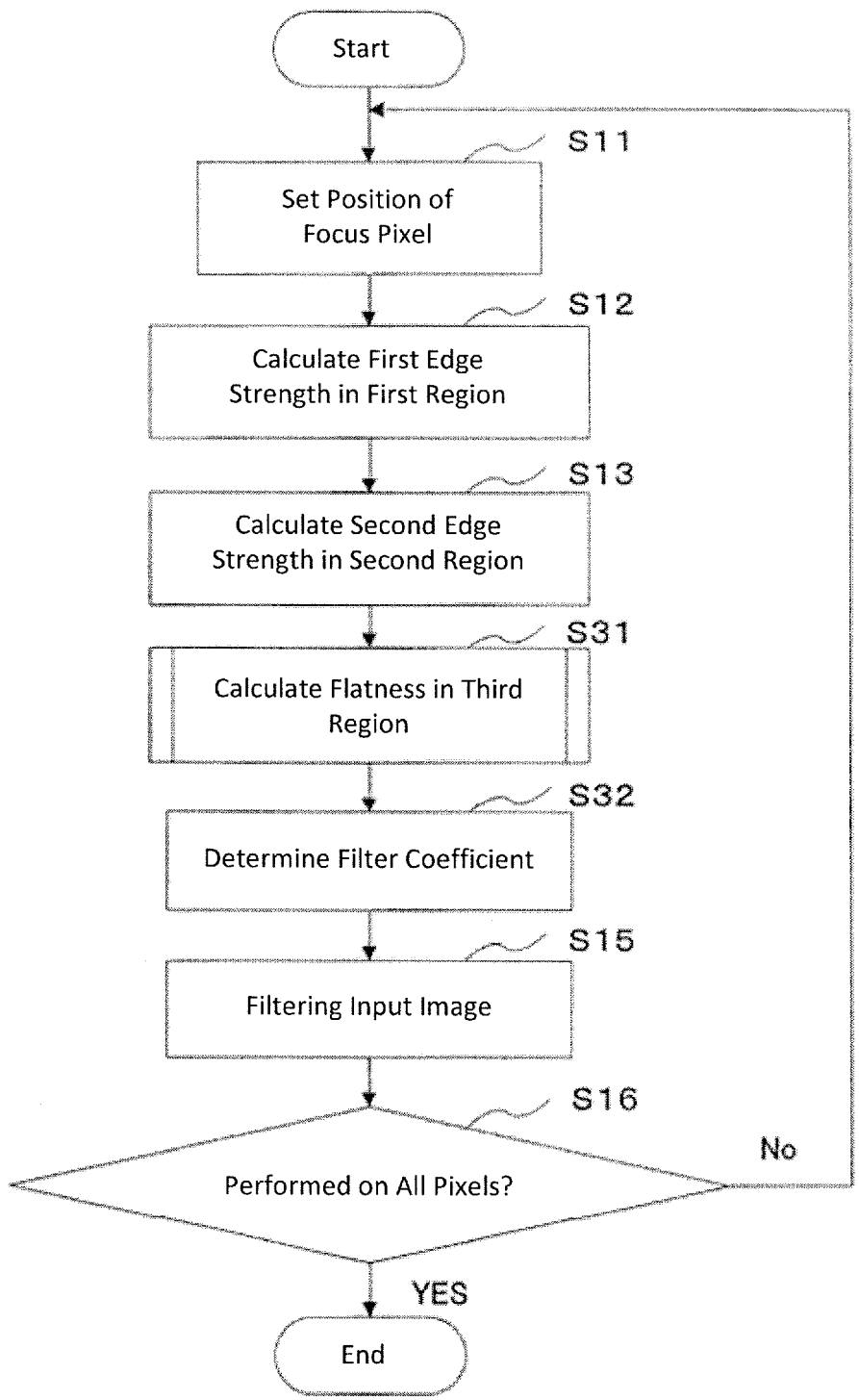
FIG. 7 is a flow diagram illustrating an operation of the third embodiment.

Next, referring to FIGS. 6 and 7, the operation of the image processing device 3 is explained. FIG. 7 is a flow diagram showing the operation of the image processing device 3. In FIGS. 6 and 7, the configuration and operation that correspond to those of the image processing device 1 are referred to by the same reference numerals, and the descriptions of such configuration and operation are omitted in the below explanation.

A flatness calculation part 401 calculates a value for flatness 403 using the luminance value of each pixel included in the third region 501 (S31). As the flatness 403, an inverse number of a calculated value may be used, the calculated value being determined by adding "1" to an average value of the absolute values of the derivative values of the pixels included in the third region 501. Alternatively, the number of the absolute values of the derivative values of the pixels included in the third region 501 that is equal to or less than a threshold value may be used.

Figure 9:
FIG. 9 illustrates a definition of image regions in the flatness calculation part.

The flatness 403 of the present embodiment is explained using FIG. 9. In FIG. 9, parts that correspond to those in FIG. 2 are referred to by the same reference numerals, and the descriptions of such parts are omitted in the below explanation. The third region 501 shown in FIG. 9 includes the focus pixel 201 and the peripheral pixels thereof. FIG. 9 shows an example in which the third region 501 is larger than the first region 202. The size of the third region 501 may be equal to or smaller than the size of the first region 202. By setting at least one partial region (fourth region 502) inside the third region 501, the flatness of each partial part (fourth region 502) is calculated. In the present embodiment, the number of pixels in the fourth region 502 in which the first order derivative value is equal to or less than a threshold value is used as a flatness evaluation value. The maximum value of the flatness evaluation values calculated for the respective fourth regions 502 is used as the flatness 403 of the third region 501. By using the flatness 403 of the present embodiment, the flatness of the focus pixel 201 is prevented from being decreased as long as the focus pixel is in the flat region in the edge periphery even if there is an edge inside the third region 501.

Figure 8:
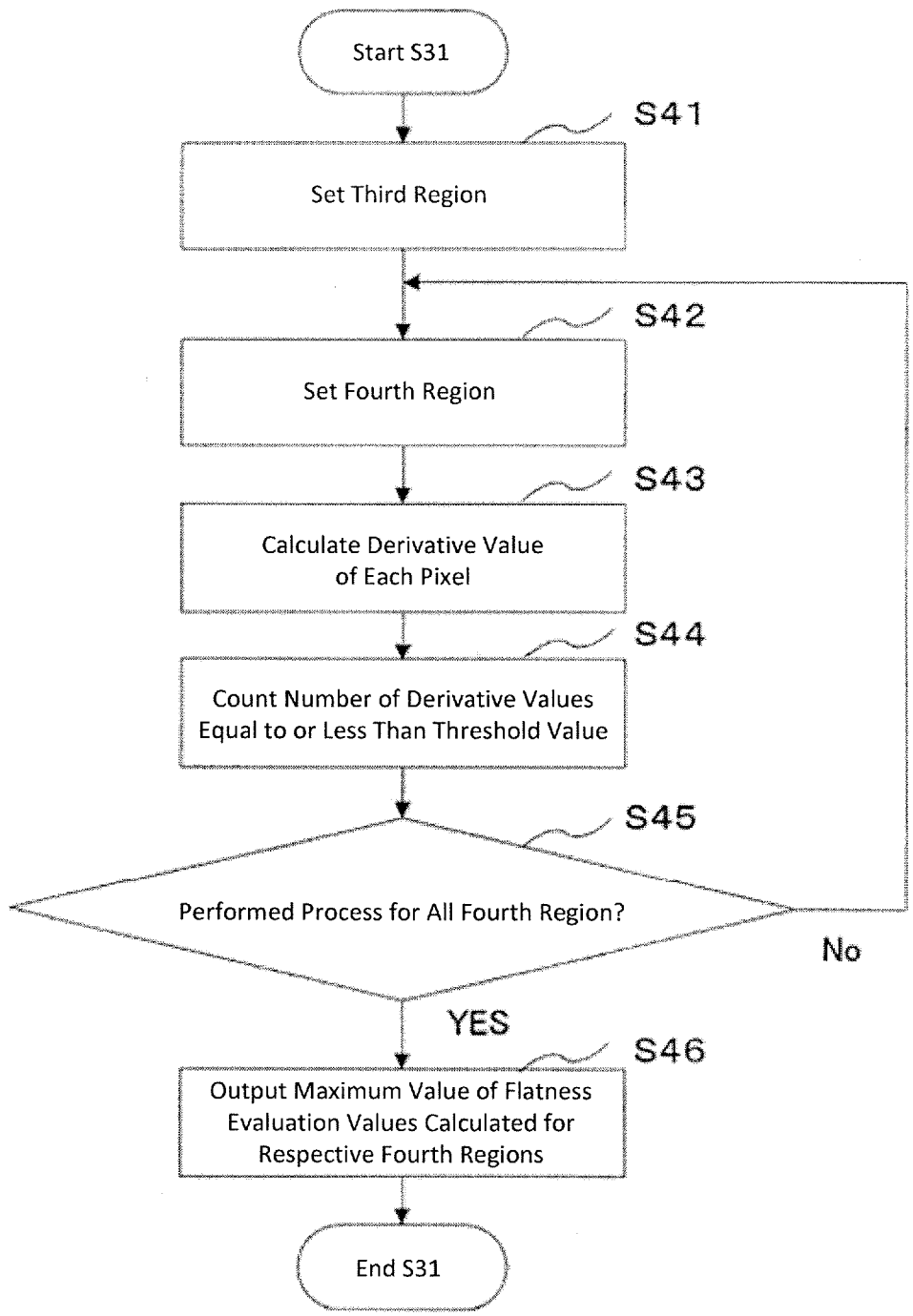
FIG. 8 is a flow diagram illustrating an operation of a flatness calculation part.

The calculation process for the flatness 403 is explained with reference to the flow diagram shown in FIG. 8.

First, the third region 501 that includes the focus pixel 201 and the peripheral pixels thereof is set (S41). Next, one or more of the fourth regions 502 that have the same size as, or are smaller than, the third region 501 are set in the third region 501 (S42). The third region 501 is a region that is used for calculating the flatness and that includes the focus pixel 201. The fourth region 502 is a region that is set inside the third region 501 and that has the same size as, or is smaller than, the third region 501. The fourth region 502 does not necessarily include the focus pixel 201. In addition, a plurality of the fourth regions 502 may overlap with each other.

First-order derivative values are calculated for the vertical and horizontal directions of each pixel in the fourth region 502 (S43). The number of the first-order derivative values that are equal to or less than a threshold value is counted (S44), then the number is used as the flatness evaluation value of the fourth region 502. A higher flatness evaluation value of the fourth region 502 indicates a smaller amount of variation of the luminance values inside the region; in other words, the region is flat.

It is determined whether or not the process of the above-described S42-S45 is performed for all fourth regions 502 inside the third region 501 (S45). When Yes, the processing proceeds to S46. When No, processing returns to S42.

The maximum value of the flatness evaluation values calculated for the respective fourth regions 502 is output as the flatness 403 for the focus pixel (S46). After S46 is completed, processing proceeds to S32 in FIG. 7.

The flatness 403 of the focus pixel 201 is hence determined and is forwarded to the smoothing filter processing part 402. The flatness 403 for the third region 501 that includes the focus pixel (x, y) and the peripheral pixels thereof is represented by flatness F(x, y). The flatness F(x, y) is represented by the following equation:

$$F(x, y) = \max[\{S_{\Omega_j}(x, y) \mid j = 1, 2 \ldots n\}] \quad \text{Equation 5}$$

$$S_\Omega(x, y) = \sum_{i \in \{x, y\}} \sum_{(k,l) \in \Omega(x,y)} D_i(x+k, y+l)$$

$$D_x(x, y) = \begin{cases} 0 & |\Delta_x(x, y)| > TH \\ 1 & |\Delta_x(x, y)| \leq TH \end{cases}$$

$$D_y(x, y) = \begin{cases} 0 & |\Delta_y(x, y)| > TH \\ 1 & |\Delta_y(x, y)| \leq TH. \end{cases}$$

In Equation 5, $\Delta x(x, y)$ is a first-order derivative value in the x direction at a pixel (x, y), $\Delta y(x, y)$ is a first-order derivative value in the y direction at the pixel (x, y). Dx(x,y) is a function to count the number of pixel which has the $\Delta x$ of threshold TH or less. Dy(x,y) is a function to count the number of pixel which has the $\Delta y$ of threshold TH or less. The variable n is the number of the fourth regions 502 set in the third region 501. $\Omega(x, y)$ is a set of relative positions (k, 1) from the pixel (x, y), $S_\Omega(x, y)$ is a flatness evaluation value for a region that is a set of (x+k, y+1) with respect to the entire (k, 1)$\in \Omega(x, y)$. $\Omega_j(x, y)$ is a set of relative positions of pixels included in a j-th fourth region 502 from the focus pixel (x, y).

The smoothing filter processing part 402 determines a filter coefficient using the first edge strength 104, the second edge strength 105 and the flatness 403 (S32). The smoothing filter processing part 402 determines the filter coefficient such that the smoothing strength increases as the flatness 403 decreases, the smoothing strength increases as the first edge strength 104 increases, and the smoothing strength increases as the second edge strength 105 decreases. $\epsilon(x, y)$ of the $\epsilon$ filter is calculated by the following equation using the edge strength difference value DMG(x, y), which is a difference value between the first edge strength 104 and the second edge strength 105, and the flatness 403 (F(x, y)). For example:

$$\epsilon(x,y) = L \times DMG(x,y) \times F(x,y) \quad \text{Equation 6.}$$

In Equation 6, L represents a preset constant value.

The smoothing filter processing part 402 generates a Y component of a pixel of the output image 107 by filtering the input image 106 using the determined filter coefficient (S15).

As discussed above, according to the image processing device 3 according to the third embodiment, mosquito noise, which stands out in the flat part, is reduced without blurring the edge and texture, by increasing the smoothing strength of the pixels in the edge periphery at which the flatness is high, while excluding the edge.

The image processing device may be realized by using a general purpose computer device as basic hardware, for example. That is, the first edge strength calculation part 101, the second edge strength calculation part 102 and the smoothing filter processing part 103 may be realized by having a processor installed in the above-described computer device execute a computer program. The image processing device may be realized by installing the program on the computer device in advance or by distributing the program as stored in a non-transitory computer readable medium, such as a CD-ROM, and appropriately installing the program on the computer device. Alternatively, a computer readable medium, such as a memory, a hard disk drive, CD-R, CD-RW, DVD-RAM and DVD-R, which is built in, or externally attached to, the computer device, may be appropriately used.

Figure 12:
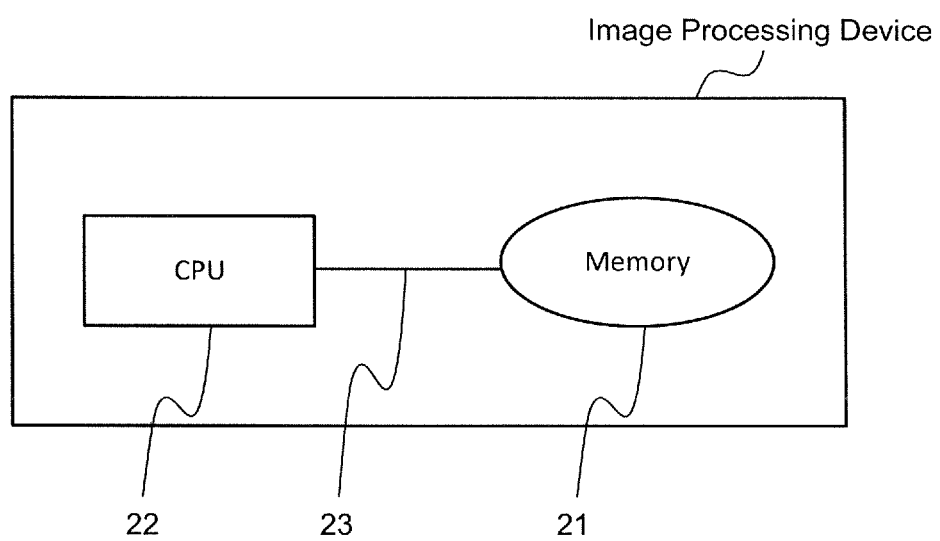
FIG. 12 illustrates an exemplary structure of an image processing device.

FIG. 12 shows such a structure of the image processing devices. The above parts are stored in a memory 21 and executed at a central processing unit (CPU 22) as a processor that connects the memory 21 through a bus 23. In that case, the motion vector detection device may be realized by installing a computer program on the computer device in advance. Alternatively, the motion vector detection device may be stored in a storage medium, such as a compact-disc-read-only-memory (CD-ROM) or distributed via a network in the form of a computer program, and the computer program may be installed in the computer device.

In addition, the first edge strength is calculated for each pixel in the above embodiments. However, the first edge strength may be calculated for each M×N pixel block that is segmented at the time of coding the image or for each wide region that includes the M×N pixel block.

Furthermore, the noise reduction process is explained for the Y component (luminance value) of the image. However, the process is not limited to the luminance value. The noise reduction process may be performed on a U component (a difference between the luminance value and blue value) value, V component value (a difference between the luminance value, and chromatic values, such as red, green and blue (RGB).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and the spirit of the inventions.

What is claimed is:

1. An image processing device, comprising:
    a first edge strength calculation part that calculates a first edge strength for a focus pixel based on pixel values in a first region that includes the focus pixel in an input image;
    a second edge strength calculation part that calculates a second edge strength for the focus pixel based on pixel values in a second region that is smaller than the first region and that includes the focus pixel;
    a flatness calculation part
        that calculates a plurality of first flatnesses for a plurality of fourth regions within a third region, first flatness increasing as variation of pixel values within a respective fourth region decreases, the third region including the focus pixel and pixels neighboring the focus pixel, and at least one of the plurality of fourth regions not including the focus pixel, and
        that selects as a second flatness a maximum first flatness from among the plurality of first flatnesses, the second flatness indicating a most flat fourth region from among the plurality of fourth regions; and
    a filter determination part that determines a filter coefficient, so that strength of the filter
        becomes stronger as the first edge strength becomes larger, the second edge strength becomes smaller, and the second flatness becomes larger, and
        becomes weaker as the first edge strength becomes smaller, the second edges strength becomes larger, and the second flatness becomes smaller; and
    a filter processing part that filters the input image using the determined filter coefficient and obtains filtered pixel values of the focus pixel.

2. The image processing device of claim 1, wherein
the filter determination part determines the filter coefficient such that a smoothing strength of the filter becomes higher as a difference value between the first edge strength and the second edge strength increases.

3. The image processing device of claim 2, wherein
the first edge strength is a difference value between a maximum value and a minimum value of the pixel values included in the first region, and
the second edge strength is a difference value between a maximum value and a minimum value of the pixel values included in the second region.

4. The image processing device of claim 2, wherein
the first edge strength is one of:
    a maximum value of first-order derivative values respectively calculated for pixels in the first region,
    a maximum value of second-order derivative values respectively calculated for pixels in the first region,
    a difference between a maximum value and a minimum value of luminance values respectively obtained at the pixels in the first region, and
    a maximum value of luminance gradients of the luminance values respectively obtained at the pixels in the first region, and
the second edge strength is one of:
    a maximum value of first-order derivative values respectively calculated for pixels in the second region,
    a maximum value of second-order derivative values respectively calculated for pixels in the second region,
    a first-order derivative value for the focus pixel,
    a second-order derivative value for the focus pixel,
    a difference between a maximum value and a minimum value of luminance values respectively obtained at the pixels in the second region, and
    a value of a luminance gradient of the focus pixel.

5. The image processing device of claim 1, wherein
the filter is an ε filter, and
the strength of the filter is a threshold value ε of the ε filter.

6. The image processing device of claim 1, wherein
the filter is a Gaussian filter, and
the strength of the filter is a standard deviation σ of the Gaussian filter.

7. The image processing device of claim 1, wherein
the filter is a bilateral filter, and
the strength of the filter is a standard deviation $\sigma_d$ in a domain direction and a range direction standard deviation $\sigma_r$ in a range direction of the bilateral filter.

8. An image processing method, comprising:

calculating a first edge strength for a focus pixel based on values of pixels in a first region that includes the focus pixel in an input image;

calculating a second edge strength for the focus pixel based on values of pixels in a second region that is smaller than the first region and that includes the focus pixel;

calculating a plurality of first flatnesses for a plurality of fourth regions within a third region, first flatness increasing as variation of pixel values within a respective fourth region decreases, the third region including the focus pixel and pixels neighboring the focus pixel, and at least one of the plurality of fourth regions not including the focus pixel, and selecting as a second flatness a maximum first flatness from among the plurality of first flatnesses, the second flatness indicating a most flat fourth region from among the plurality of fourth regions; and determines a filter coefficient, so that strength of the filter becomes stronger as the first edge strength becomes larger, the second edge strength becomes smaller, and the second flatness becomes larger, and becomes weaker as the first edge strength becomes smaller, the second edges strength becomes larger, and the second flatness becomes smaller; and filters the input image using the determined filter coefficient and obtaining filtered pixel values of the focus pixel.

9. The image processing device of claim 8, wherein
the filter is an $\epsilon$ filter, and
the strength of the filter is calculated as a threshold value $\epsilon$ of the $\epsilon$ filter.

10. The image processing method of claim 8, wherein
the filter is a Gaussian filter, and
the strength of the filter is calculated as a standard deviation $\epsilon$ of the Gaussian filter.

11. The image processing method of claim 8, wherein
the filter is a bilateral filter, and
the strength of the filter is calculated as a standard deviation $\epsilon_d$ in a domain direction and a range direction standard deviation $\epsilon_r$ in a range direction of the bilateral filter.

12. The device according to claim 1, wherein
the first flatness is a number of pixels, at which absolute values of first order derivative values in x direction and y direction is less than or equal to a threshold.

* * * * *